(12) United States Patent
Bzducha

(10) Patent No.: US 8,207,273 B2
(45) Date of Patent: Jun. 26, 2012

(54) BLOCK COPOLYMERS USEFUL AS TENSIONING AGENTS

(75) Inventor: Wojciech Bzducha, Courbevoie (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 11/886,465

(22) PCT Filed: Mar. 17, 2006

(86) PCT No.: PCT/FR2006/000595
§ 371 (c)(1), (2), (4) Date: Jul. 14, 2008

(87) PCT Pub. No.: WO2006/097641
PCT Pub. Date: Sep. 21, 2006

(65) Prior Publication Data
US 2009/0221756 A1    Sep. 3, 2009

(30) Foreign Application Priority Data
Mar. 17, 2005 (FR) ..................... 05 02669

(51) Int. Cl.
C08L 33/10 (2006.01)

(52) U.S. Cl. ........ 525/299; 525/242; 525/298; 525/302; 525/309; 524/505

(58) Field of Classification Search .................. 525/242, 525/298, 299, 302, 308, 309; 524/505
See application file for complete search history.

(56) References Cited

U.S. PATENT DOCUMENTS

| | | | |
|---|---|---|---|
| 6,153,705 A | 11/2000 | Corpart et al. | |
| 6,506,837 B2 | 1/2003 | Destarac et al. | |
| 6,545,098 B1 | 4/2003 | Bouhadir et al. | |
| 6,777,513 B1 | 8/2004 | Destarac et al. | |
| 2001/0034428 A1 | 10/2001 | Destarac et al. | |
| 2002/0040098 A1* | 4/2002 | Maekawa et al. | 525/88 |
| 2003/0162896 A1* | 8/2003 | Destarac et al. | 525/71 |
| 2003/0191044 A1* | 10/2003 | Carswell et al. | 510/476 |
| 2003/0212213 A1 | 11/2003 | Bendejacq et al. | |
| 2004/0102565 A1* | 5/2004 | Maekawa et al. | 524/500 |
| 2005/0054794 A1 | 3/2005 | Destarac et al. | |

FOREIGN PATENT DOCUMENTS

WO    WO 01/16187 A1    3/2001

* cited by examiner

Primary Examiner — Irina S Zemel
Assistant Examiner — Jeffrey Lenihan
(74) Attorney, Agent, or Firm — SNR Denton US LLP

(57) ABSTRACT

Novel linear block copolymers, for example containing styrene blocks and ethyl(meth)acrylate blocks, and non-cosmetic compositions comprised thereof, are useful tensioning agents for a variety of surface substrates.

15 Claims, No Drawings

US 8,207,273 B2

BLOCK COPOLYMERS USEFUL AS TENSIONING AGENTS

CROSS-REFERENCE TO PRIORITY APPLICATIONS

This application is the United States national phase of International Application No. PCT/FR 2006/000595, filed Mar. 17, 2006, published in French as International Publication No. WO 2006/097641 A1 on Sep. 21, 2006, and claims priority of French Patent No. 05 02669, filed Mar. 17, 2005, each hereby expressly incorporated by reference in its entirety and each assigned to the assignee hereof.

One subject of the present invention is a novel linear block copolymer, which may be used as a surface tensor. The invention also relates to non-cosmetic compositions comprising the copolymer. The copolymer comprises, in particular, a block based on styrene and a block based on ethyl acrylate or ethyl methacrylate.

There is a constant need in industry for novel chemical compounds, which may provide novel benefits, for example benefits brought to a consumer by a composition comprising a chemical compound or benefits in terms of implementing industrial processes, or which may technically or economically simplify how these benefits are obtained.

Recently, many documents have described block copolymers, of various compositions, and uses for providing various benefits.

Thus, the use of certain block copolymers has been described in the fields of cosmetics, home care, coatings and paints, to modify surfaces for example the skin and/or hair in the cosmetics field, laundry, hard surfaces or washing-up in the home care field. The use of block copolymers has also been described for the effects of emulsification, dispersion of solid particles, formation of films, or as aids for obtaining these effects.

Document WO 03/095513 describes block copolymers that comprise a block A comprising units that derive from styrene, and a block B comprising units that derive from ethyl acrylate, with a weight ratio of the block A to the block B less than 0.5. The copolymers are elastomeric and are not suitable as surface tensors.

Document WO 01/16187 describes "intermediate product" block copolymers that comprise a block A comprising units that derive from styrene and a block B comprising units that derive from ethyl acrylate. These block copolymers are then hydrolyzed to form block copolymers that comprise a block A comprising units that derive from styrene and a block B' comprising units that derive from acrylic acid (hydrolysate of ethyl acrylate) and units that derive from ethyl acrylate (non-hydrolyzed). The "intermediate product" block copolymers have a weight ratio of the block A to the block B less than 1. No property is given in regard to this intermediate product.

There is a need for novel block copolymers, especially for block copolymers which can be used as surface tensors.

The present invention meets this need by providing a linear block copolymer A-[B-A]$_n$ or B-[A-B]n or [A-B]$_n$ in which A is a block comprising at least 50 wt % of units that derive from styrene, B is a block comprising at least 50 wt % of units that derive from ethyl acrylate or from ethyl methacrylate, and n is a number greater than or equal to 1, characterized in that the weight ratio between the units that derive from styrene and the units that derive from ethyl acrylate or from ethyl methacrylate is greater than or equal to 1.

The present invention also relates to a non-cosmetic composition comprising the copolymer, and a preferably aqueous or non-aqueous liquid vector.

The present invention also relates to a process for treating and/or modifying and/or coating surfaces, preferably non-keratinous surfaces (in particular surfaces other than skin, nails, hair, eyelashes or other hair growths), that comprises a step of applying a composition comprising the copolymer to the surface.

The composition is preferably a non-cosmetic composition.

The present invention also relates to the use of the copolymer as a tensioning agent for surfaces, preferably non-keratinous surfaces. The surfaces are preferably surfaces other than keratinous surfaces.

DEFINITIONS

In the present application, the expression "unit deriving from a monomer" denotes a unit which may be obtained directly from said monomer by polymerization. Thus, for example, a unit deriving from an acrylic or methacrylic acid ester does not cover a unit of formula —CH$_2$—CH(COOH)—, or —CH$_2$—C(CH$_3$)(COOH)—, obtained for example by polymerizing an acrylic or methacrylic acid ester, then by hydrolyzing it.

In the present application, except where mentioned otherwise, the average molecular weight of a block or of a copolymer denotes the theoretical or "targeted" average molecular weight of a block or a copolymer.

The theoretical average molecular weight $M_{block}$ of a block, is typically calculated according to the following formula:

$$M_{block} = \sum_i M_i * \frac{n_i}{n_{precursor}},$$

where $M_i$ is the molecular weight of a monomer i, $n_i$ is the number of moles of the monomer i, $n_{precursor}$ is the number of moles of functional groups to which the macromolecular chain of the block will be linked. The functional groups may come from a transfer agent (or a transfer group) or an initiator, a previous block, etc. If this is a previous block, the number of moles may be considered as the number of moles of one compound to which the macromolecular chain of said previous block has been linked, for example a transfer agent (or a transfer group) or an initiator. In practice, the theoretical average molecular weights are calculated from the number of moles of monomers introduced and from the number of moles of precursor introduced.

In the present application, the theoretical average molecular weight of a copolymer is determined by addition of the theoretical average molecular weights of the blocks.

In the present application, the measured average molecular weight of a first block or a copolymer denotes the number-average molecular weight in polystyrene equivalents of a block or copolymer, measured by size exclusion chromatography (SEC), in THF, with a calibration using polystyrene standards. The measured average molecular weight of an n$^{th}$ block in a copolymer having n blocks is defined s the difference between the measured average molecular weight of the copolymer and the measured average molecular weight of the copolymer having (n−1) blocks from which it is prepared.

Copolymer

The copolymer is a linear block copolymer A-[B-A]$_n$ or B-[A-B]$_n$ or [A-B]$_n$. The blocks A and B are connected together linearly. If n=1 the copolymer is an A-B-A or B-A-B triblock copolymer, or an A-B diblock copolymer. If n=2, the copolymer is an A-B-A-B-A or B-A-B-A-B or A-B-A-B copolymer. If $n \geq 3$, it is not a star or telechelic copolymer in which an A block or a B block would form a core. Preferably, n=1, more preferably the copolymer is an A-B-A triblock copolymer. It is noted that the copolymer may comprise polymerization functions or groups or residues of such functions or groups, as macromolecular chain ends. These may be, for example, transfer groups, or residues of transfer groups, comprising for example a group of formula —S—CS—, or a residue of this group.

The block A comprises at least 50% by weight of units deriving from styrene (relative to the total weight of the block A). The block A may comprise other units than those deriving from styrene, which may be intended to adjust properties of the copolymer or to facilitate its preparation. The block A may therefore be a random copolymer comprising units that derive from styrene and other units. It is thus possible to adjust the solubility of the block A in water or in other media, or to adjust its glass transition temperature and thus to adjust its rigidity. The other units of block A may be units that derive from monomers chosen from acrylic acid, methacrylic acid, methyl, ethyl, butyl, ethylhexyl or 2-hydroxyethyl acrylate, or methyl, ethyl, butyl, ethylhexyl or 2-hydroxyethyl methacrylate. The presence of small amounts of methacrylic acid may especially facilitate the preparation of the copolymer, the block A may for example comprise therein 0.1% to less than 5% by weight relative to the total weight of the block A. The block A preferably comprises at least 75% by weight, preferably at least 90% by weight, preferably at least 95% by weight, of units that derive from styrene (relative to the total weight of the block A).

The block B comprises at least 50% by weight of units that derive from ethyl acrylate or from ethyl methacrylate. The block B may comprise other units than those that derive from ethyl acrylate or from ethyl methacrylate, which may be intended to adjust properties of the copolymer or to facilitate its preparation. The block B may therefore be a random copolymer comprising units that derive from ethyl acrylate or ethyl methacrylate and other units. It is thus possible to adjust the solubility of the block B in water or in other media, or to adjust its glass transition temperature and thus adjust its rigidity. The other units of the block B may be units that derive from monomers chosen from acrylic acid, methacrylic acid, methyl, butyl, ethylhexyl or 2-hydroxyethyl acrylate or methyl, butyl, ethylhexyl or 2-hydroxyethyl methacrylate, or styrene. The presence of small amounts of methacrylic acid may in particular facilitate the preparation of the copolymer, the block B may for example comprise therein 0.1% to less than 5% by weight (relative to the total weight of the block B). The block B may alternatively not comprise units that derive from methacrylic acid. The block A preferably comprises at least 75% by weight, preferably at least 90% by weight, preferably at least 95% by weight, of units that derive from ethyl acrylate or ethyl methacrylate (relative to the total weight of block B).

The weight ratio of the units that derive from styrene to the units that derive from ethyl acrylate or ethyl methacrylate is greater than or equal to 1, preferably greater than or equal to 1.5, preferably greater than or equal to 2.01, preferably greater than or equal to 2.5, preferably greater than or equal to 5. The ratio may be determined by calculating the ratio between the monomers introduced for preparing the copolymer, or by calculating the ratio between the average molecular weights of the blocks. Preferably, the ratio between the average molecular weights of the blocks is greater than or equal to 1, preferably greater than or equal to 1.5, preferably greater than or equal to 2.01, preferably greater than or equal to 2.5, preferably greater than or equal to 5.

According to one particular embodiment, the copolymer is different from an A-B diblock copolymer in which the weight ratio of the units that derive from styrene to the units that derive from ethyl acrylate or ethyl methacrylate is less than 1.5, or less than 2.01 or less than 2.5 or less than 5. Preferably, the copolymer different from an A-B diblock copolymer.

According to one advantageous embodiment, the copolymer has an average molecular weight between 20,000 and 1,000,000 g/mol, preferably between 50,000 and 200,000 g/mol. The block A advantageously has an average molecular weight between 1,000 and 200,000 g/mol, preferably between 10,000 and 100,000 g/mol. The block B advantageously has an average molecular weight between 1,000 and 100,000 g/mol, preferably between 2,000 and 50,000 g/mol.

The copolymer may have a measured average molecular weight between 20,000 and 1,000,000 g/mol, preferably between 50,000 and 200,000 g/mol. The block A may advantageously have a measured average molecular weight between 1,000 and 200,000 g/mol, preferably between 10,000 and 100,000 g/mol. The block B may advantageously have a measured average molecular weight between 1,000 and 100,000 g/mol, preferably between 2,000 and 50,000 g/mol.

The copolymer may advantageously have an instantaneous recovery $R_i < 50\%$, preferably $R_i < 30\%$, and a delayed recovery $R_{2h} < 70\%$, preferably $R_{2h} < 50\%$, after an elongation of 30%. This embodiment is particularly advantageous within the context of use of the copolymer as a tensor.

The recoveries may be determined according to the following protocol:

A copolymer film is prepared by casting a solution or dispersion of the copolymer in a Teflon-coated mold, then drying it for 7 days in a controlled environment at 23±5° C. and 50±10% relative humidity.

A film having a thickness of about 100 µm is thus obtained, from which rectangular test pieces having a width of 15 mm and a length of 80 mm are cut out (for example using a punch).

These samples in the form of test pieces are subjected to a tensile stress using a machine with the reference Zwick, under the same temperature and humidity conditions as for the drying.

The test pieces are pulled at a rate of 50 mm/min and the distance between the jaws is 50 mm, which corresponds to the initial length ($l_0$) of the test piece.

The instantaneous recovery $R_i$ is determined in the following manner:
  the test piece is stretched by 30% ($\epsilon_{max}$), that is to say about 0.3 times its initial length ($l_0$); and
  the stress is released by unloading at a rate equal to the pull rate, namely 50 mm/min and the residual elongation ($\epsilon_i$) of the test piece is measured as a percentage, after the return to zero stress ($\epsilon_i$).

The instantaneous recovery $R_i$ (in %) is determined by the following equation:

$$R_i = 100 \times (\epsilon_{max} - \epsilon_i)/(\epsilon_{max}).$$

To determine the delayed recovery, the residual elongation ($\epsilon_{2h}$) of the test piece was measured as percentage, two hours after return to the zero stress. The delayed recovery ($R_{2h}$) (in %) is determined by the following equation:

$$R_{2h} = 100 \times (\epsilon_{max} - \epsilon_{2h})/(\epsilon_{max}).$$

Copolymers that can be used are especially the following:
A-B-A' (or more simply A-B-A) triblock copolymer where:

the block A is a first block having a theoretical average molecular weight of 30,000 g/mol, comprising at least 95 wt % of units that derive from styrene, and at least 0.1 wt % of units that derive from methacrylic acid;

the block B is a second block having a theoretical average molecular weight of 10,000 g/mol, comprising at least 95 wt %, preferably 100 wt %, of units that derive from ethyl acrylate;

the block A' is a third block having a theoretical average molecular weight of 30,000 g/mol, comprising at least 95 wt % of units that derive from styrene, and at least 0.1 wt % of units that derive from methacrylic acid; or A-B-A' (or more simply A-B-A) triblock copolymer where:

the block A is a first block having a theoretical average molecular weight of 25,000 g/mol, comprising at least 95 wt % of units that derive from styrene, and at least 0.1 wt % of units that derive from methacrylic acid;

the block B is a second block having a theoretical average molecular weight of 20,000 g/mol, comprising at least 95 wt %, preferably 100 wt %, of units that derive from ethyl acrylate;

the block A' is a third block having a theoretical average molecular weight of 25,000 g/mol, comprising at least 95 wt % of units that derive from styrene, and at least 0.1 wt % of units that derive from methacrylic acid; or A-B-A' (or more simply A-B-A) triblock copolymer where:

the block A is a first block having a theoretical average molecular weight of 32,500 g/mol, comprising at least 95 wt % of units that derive from styrene, and at least 0.1 wt % of units that derive from methacrylic acid;

the block B is a second block having a theoretical average molecular weight of 5,000 g/mol, comprising at least 95 wt %, preferably 100 wt %, of units that derive from ethyl acrylate; and the block A' is a third block having a theoretical average molecular weight of 32,500 g/mol, comprising at least 95 wt % of units that derive from styrene and at least 0.1 wt % of units that derive from methacrylic acid.

The copolymer according to the invention may be presented in the form of a solution or a dispersion in a liquid medium, or in solid form, for example in the form of powder, flakes, or a film. It is preferably presented in the form of a dispersion that is insoluble in water. Mention may be made of a polymer in emulsion or in the form of a latex. The concentration of polymer dispersed in the water may, for example, be between 5 and 70% by weight, preferably between 25% and 55% by weight. The dispersion form that is insoluble in water may be advantageously that under which the copolymer is derived from its preparation process. The concentrations may be adjusted by playing on the parameters of the polymerization process (relative amounts of monomer and water used), or by carrying out dilutions or concentrations following the polymerization.

Process for Preparing the Copolymer

The copolymers according to the invention may be obtained by any known method, whether this is by controlled or uncontrolled radical polymerization, by ring-opening polymerization (especially anionic or cationic ring-opening polymerization), by anionic or cationic polymerization, or else by chemical modification of a polymer.

Preferably, the so-called living or controlled radical polymerization methods are used, and particularly preferably controlled or living radical polymerization methods that use a transfer agent comprising a group of formula —S—CS—, especially known under the names RAFT or MADIX.

As examples of so-called living or controlled polymerization processes, reference may especially be made to:

the processes from Applications WO 98/58974, WO 00/75207 and WO 01/42312 which carry out controlled radical polymerization using xanthate-type control agents;

the controlled radical polymerization process using dithioester type control agents from Application WO 98/01478;

the controlled radical polymerization process using dithiocarbamate type control agents from Application WO 99/31144;

the controlled radical polymerization process using dithiocarbazate type control agents from Application WO 02/26836;

the controlled radical polymerization process using dithiophosphoroester type control agents from Application WO 02/10223, (optionally the block copolymers obtained as above by controlled radical polymerization may undergo a reaction for purifying their sulfur-containing chain end, for example by hydrolysis, oxidation, reduction, pyrolysis, ozonolysis or substitution type processes)

the process from Application WO 99/03894 which carries out a polymerization in the presence of nitroxide precursors, or the processes using other nitroxides or nitroxide/alkoxyamine complexes;

the process from Application WO 96/30421 which uses an atom transfer radical polymerization (ATRP);

the controlled radical polymerization process using iniferter type control agents according to the teaching of Otu et al., Makromol. Chem. Rapid. Commun., 3, 127 (1982);

the controlled radical polymerization process using degenerative iodine transfer according to the teaching of Tatemoto et al., Jap. 50, 127, 991 (1975) Daikin Kogyo Co Ltd Japan and Matyjaszewski et al., Macromolecules, 28, 2093 (1995);

the controlled radical polymerization process using tetraphenylethane derivatives, disclosed by D. Braun et al. in Macromol. Symp. 111, 63 (1996); or else the controlled radical polymerization process using organocobalt complexes described by Wayland et al. in J. Am. Chem. Soc. 116, 7973 (1994); and the controlled radical polymerization process using diphenylethylene (WO 00/39169 or WO 00/37507).

Using the processes described above, it is possible to carry out the preparation of a first block from monomers or from a blend of monomers of initiators and/or agents favoring the control of the polymerization (transfer agents having —S—CS— groups, nitroxides, etc.), then the growth of a second block onto the first block to obtain a diblock copolymer with monomers different from those used for preparing the previous block, and optionally with addition of initiators and/or agents favoring the control of the polymerization, then the growth of a third block onto the diblock copolymer to obtain a triblock copolymer, etc. These processes for preparing block copolymers are known to a person skilled in the art. It is mentioned that the copolymer may have, as chain end, a transfer group or a residue of a transfer group, for example a group comprising an —S—CS-group (for example derived from a xanthate or a dithioester) or a residue of such a group.

It is mentioned that the triblock copolymers obtained by processes using three successive polymerization sequences are often described as A-B-C block copolymers. In the case where the composition and the molecular weight of the third block C are approximately identical to the composition and molecular weight of the first block A (the amounts and proportions of (co)monomers being approximately identical), the triblock copolymers may be described as A-B-A' triblock copolymers or by extension or simplification as A-B-A triblock copolymers.

Thus, it is possible for example to prepare an A-B-A triblock copolymer according to the invention by a process comprising the following steps:
  step a): preparation of the block A by polymerization, preferably controlled radical polymerization, of a composition comprising:
    styrene;
    a source of free radicals; and
    at least one control agent, preferably an agent that comprises an —S—CS-group, for example a xanthate or a dithioester;
  step b): production of the A-B diblock copolymer by growth of the block B onto the block A, by polymerization, preferably controlled radical polymerization, of a composition comprising:
    ethyl acrylate or ethyl methacrylate; and
    optionally a source of free radicals;
  step c): production of the A-B-A triblock copolymer by growth of the block A onto the A-B diblock, by polymerization, preferably controlled radical polymerization, of a composition comprising:
    ethyl acrylate or ethyl methacrylate; and
    optionally a source of free radicals;
  step d): optionally destruction or deactivation of one group of the control agent.

According to other embodiments, A-B-A triblock copolymers are prepared in two polymerization sequences, using agents that comprise two transfer groups or agents that comprise one transfer group that allows a transfer at each end of the group, for example a trithiocarbonate comprising a group of formula —S—CS—S—. In such processes, the blocks A are perfectly identical, and the block B generally comprises a central group different from the repeat units of the block B. Mention of the presence of a central group within the block B, for example noted as —X—, —X—Z'—X— or R' below, is often omitted for reasons of simplification.

Thus, it is possible to prepare A-B-A triblock copolymers by the following process:
  step a'): preparation of a polymer of formula R-A-X-A-R by polymerization of a composition comprising:
    styrene;
    a source of free radicals; and
    at least one control agent of formula R—X—R where R, being identical or different, is an organic group and X is a transfer group, the agent preferably being a trithiocarbonate comprising an —X-group of formula —S—CS—S— and preferably two identical R groups such as benzyl groups (the agent therefore being, for example, dibenzyl-trithiocarbonate);
  step b') production of the R-A-B—X—B-A-R (or more simply A-B-A) triblock copolymer by growth of the block B onto the blocks A by polymerization, preferably controlled radical polymerization, of a composition comprising:
    ethyl acrylate or ethyl methacrylate; and
    optionally a source of free radicals.

It is also possible to prepare A-B-A triblock copolymers by the following process:
  step a"): preparation of a polymer of formula R-A-X—Z'—X-A-R by polymerization of a composition comprising:
    styrene;
    a source of free radicals; and
    at least one control agent of formula R—X—Z'—X—R where R, being identical or different, is an organic group, Z' is a divalent organic group, and X is a transfer group, preferably a transfer group comprising an —S—CS— group, said agent being, for example:
      an agent comprising two xanthate groups, where —X— is a group of formula —S—CS— forming with —Z'— a group of formula —S—CS—O— (xanthate), Z' being, for example, a group of formula —O—CH$_2$—CH$_2$—O—, and R is for example a benzyl group or a group of formula H$_3$C—OOC—CH(CH$_3$)—; or
      an agent comprising two dithioester groups, where —X— is a group of formula —S—CS— forming with —Z'— a group of formula —S—CS—C— (dithioester), Z' being, for example, a phenyl or benzyl group, or a group of formula —CH$_2$—C$_6$H$_5$—CH$_2$—, and R is, for example, a benzyl group;
  step b") production of the R-A-B—X—Z'—X—B-A-R (or more simply A-B-A) triblock copolymer by growth of the block B onto the blocks A by polymerization, preferably controlled radical polymerization, of a composition comprising:
    ethyl acrylate or ethyl methacrylate; and
    optionally a source of free radicals.

It is also possible to prepare A-B-A triblock copolymers by the following process:
  step a'''): preparation of a polymer of formula Z—X—B—R'—B—X—Z by polymerization of a composition comprising:
    ethyl acrylate or ethyl methacrylate;
    a source of free radicals; and
    at least one control agent of formula Z—X—R'—X—Z where Z, being identical or different, is an organic group, R' is a divalent organic group, and X is a transfer group, preferably a transfer group comprising an —S—CS— group, said agent being, for example:
      an agent comprising two xanthate groups, where —X— is a group of formula —S—CS— forming with Z— a group of formula —O—CS—S— (xanthate), Z— being, for example, an ethoxy group, and —R'— is for example a phenyl or benzyl group, or a group of formula —CH$_2$—C$_6$H$_5$—CH$_2$—,
      an agent comprising two dithioester groups, where —X— is a group of formula —S—CS— forming with Z— a group of formula C—CS—S— (dithioester), Z— being for example a phenyl or benzyl group, and —R'— is for example a phenyl or benzyl group, or a group of formula —CH$_2$—C$_6$H$_5$—CH$_2$—;
  step b''') production of the Z—X-A-B—R'—B-A-X—Z (or more simply A-B-A) triblock copolymer by growth of the block A onto the blocks B by polymerization, preferably controlled radical polymerization, of a composition comprising:
    styrene; and
    optionally a source of free radicals:
  step d''') optionally destruction or deactivation of one group of the control agent.

The polymerizations may be carried out in any suitable physical form, for example in solution in a solvent, as an emulsion in water (process known as "latex"), in bulk, if necessary by controlling the temperature and/or the pH in order to make the species liquid and/or soluble or insoluble.

Compositions

The copolymer may be used in a non-cosmetic composition (composition which is not intended to be applied to a keratinous surface).

The composition comprises the copolymer and a vector. Preferably the vector is a liquid vector, which may or may not be aqueous.

The vector may especially be a substance or a mixture that enables the copolymer to be dissolved. Mention can be made of a solvent or a solvent mixture. The vector may also be a substance that allows the copolymer to be dispersed. Other than the copolymer and the vector, the composition may of course comprise other ingredients, which may be present in the composition in various forms, for example in the forms of solutions, emulsions or dispersions. The composition may thus be an emulsion of which one of the phases is the vector. For example, it may be an oil-in-water emulsion, the vector being the aqueous phase. The copolymer may especially be included in a vector which is itself one phase of a complex composition comprising said phase.

As non-cosmetic compositions, mention is especially made of compositions for treating and/or modifying and/or coating fabric surfaces, domestic or industrial surfaces, and/or surfaces of buildings and civil engineering works.

It may especially be:
a detergent composition for hard surfaces;
a washing powder (for fabric surfaces);
a fabric softener;
a composition to make fabrics easier to iron; or
a coating composition, for example a paint, or a hydraulic binder composition such as a wall primer or plaster.

The compositions may especially comprise, depending on the purpose:
surfactants, for example anionic, cationic, non-ionic and/or amphoteric surfactants (including zwitterionic surfactants), for example for detergent compositions for hard surfaces or for washing powders;
fabric softeners, especially cationic surfactants or polymers other than the copolymer of the invention, for example natural polymers such as starch, derivatives of polymers, especially cationic derivatives, synthetic polymers, especially cationic synthetic polymers, silicone oils;
rheology modifiers, for example thickeners or gelling agents;
agents for forming coatings, for example monomers, oligomers or polymers which can form films and/or are capable of crosslinking, non-hydraulic binders, especially for coatings such as paints;
hydraulic binders, for hydraulic-binder coatings, such as plasters or wall primers; and
solvents or co-solvents.

The amount by weight of the copolymer (expressed as dry matter) in the composition may advantageously be between 0.5 and 20%, preferably between 1 and 10%.

Process for Treating and/or Modifying and/or Coating Surfaces and Uses Thereof.

The copolymer may be used for treating and/or modifying and/or coating non-keratinous surfaces. The treatment is a process comprising a step of applying a composition comprising the copolymer to the surface. The surfaces and compositions have been described above. After application of the composition, the vector, depending on its nature, may be removed, for example by absorption, adsorption and/or evaporation. The evaporation may be natural or accelerated by heating.

The treatment and/or modification and/or coating are linked to the application of the composition. A treated and/or modified and/or coated surface is a surface which comprises elements of the surface before the treatment, and the copolymer.

Surfaces which may be thus treated comprise:
fabric surfaces, typically of the laundry;
hard surfaces, such as domestic surfaces, for example metal, ceramic, glass or plastic surfaces, typically kitchen or bathroom or toilet surfaces, or glazing;
walls (including ceilings) in the building and civil engineering fields; and
automobile bodywork.

The copolymer may thus be used as a tensioning agent for surfaces. For fabric surfaces, it may especially delay the appearance of creasing with use, and/or prevent ironing after hand- or machine-washing, and/or make ironing easier. For domestic and/or industrial surfaces and building and civil engineering surfaces, for example coating compositions, such as paints or hydraulic binder compositions, it is possible to prevent or limit the formation of cracking during drying or afterwards, during ageing or while being subjected to larger or smaller stresses, for example linked to temperature variations, deformations, or ground movements.

Other details or advantages of the invention will become apparent in light of the examples that follow, of a non-limiting nature.

EXAMPLE 1a

Preparation of a Polystyrene-Block-Poly(Ethyl Acrylate)-Block-Polystyrene Triblock Copolymer "$pS_{30k}$-$pEA_{10k}$-$pS_{30k}$"

The procedure was based on a process which could be broken down into three distinct phases, a first step to obtain a polystyrene block, a second step to synthesize a poly(ethyl acrylate) block following on from the first block and a third step to synthesize a polystyrene block following on from the second block, in order to obtain the polystyrene-b-poly(ethyl acrylate)-b-polystyrene triblock.

The synthesis of this copolymer was carried out in a 2-liter SVL type glass reactor. The maximum working volume of this type of reactor was 1.5 liters. The temperature inside the reactor was regulated by a Huber cryostat. The temperature was measured by a pt 100 probe immersed in the reactor and serving for regulation. The stirring unit was a stainless steel paddle. The rotation speed of the spindle was around 200 rpm. The reactor was also fitted with a reflux device (coil condenser) sufficiently effective to allow reflux of the monomers without product loss.

The process used was a latex-type emulsion polymerization process in water.

Step 1: Preparation of a First Polystyrene Block Having a Theoretical Molecular Weight of about 30,000 g/mol "$pS_{30k}$"

In reality, this was a synthesis of a random styrene/methacrylic acid copolymer, with an St/MAA weight ratio=98/2. Targeted theoretical weight: $M_n$=30,000 g/mol. It is referred to as a polystyrene block for reasons of simplicity of the terminology.

568.0 g of water, 12.0 g of sodium dodecyl sulfate and 0.95 g of sodium carbonate $Na_2CO_3$ were introduced, at room temperature, as feed stock. The mixture obtained was stirred for 30 minutes (200 rpm) under nitrogen. The temperature was then raised to 75° C., and then a mixture 1 was added, this mixture comprising:

25.71 g of styrene (St);
0.510 g of methacrylic acid (MAA), and
1,790 g of xanthate $(CH_3)(CO_2CH_3)CH—S(C=S)OCH_2CH_3$.

The mixture was brought to 85° C., then a solution of 0.390 g of ammonium persulfate $(NH_4)_2S_2O_8$ dissolved in 10.0 g of water was introduced.

After 5 minutes, the addition of a mixture 2 was started, this mixture comprising:
231.4 g of styrene (St) and
4.60 g of methacrylic acid (MAA).

The addition was continued for 115 minutes. After complete addition of the various ingredients, the copolymer emulsion obtained was kept at 85° C. for two hours.

A sample (~5 g) was then removed and analyzed by size exclusion chromatography (SEC) in THF. Its measured number-average molecular weight Mn was equal to 26,600 g/mol in polystyrene equivalents (calibration by linear polystyrene standards). Its polydispersity index Mw/Mn was equal to 2.0.

An analysis of the sample by gas chromatography revealed that the monomer conversion was greater than 99%.

Step 2: Preparation of a Second Block of Poly(Ethyl Acrylate) Having a Theoretical Molecular Weight of Around 10,000 g/mol to Obtain a Polystyrene-Block-Poly(Ethyl Acrylate) Diblock Copolymer "$pS_{30k}$-$pEA_{10k}$"

The emulsion copolymer obtained previously in step 1 was used as starting material after having removed ~5 g for analysis and without having stopped the heating.

0.390 g of ammonium persulfate $(NH_4)_2S_2O_8$ diluted in 50.0 g of water were introduced continuously over 1 hour.

The following were added simultaneously over 1 hour at 85° C.:
85.7 g of ethyl acrylate (EA).

The system was held at this temperature for a further two hours.

A sample (~5 g) was then removed and analyzed by size exclusion chromatography (SEC) in THF. Its measured number-average molecular weight $M_n$ was equal to 37,000 g/mol in polystyrene equivalents (calibration by linear polystyrene standards). Its polydispersity index Mw/Mn was equal to 1.9.

An analysis of the sample by gas chromatography revealed that the monomer conversion was greater than 0.99%.

Step 3: Preparation of a Third Block of Polystyrene Having a Theoretical Molecular Weight of Around 30,000 g/mol to Obtain a Polystyrene-Block-Poly(Ethyl Acrylate)-Block-Polystyrene Triblock Copolymer "$pS_{30k}$-$pEA_{10k}$-$pS_{30k}$"

In reality, this was a synthesis of a random styrene/methacrylic acid copolymer. St/MAA weight ratio=98/2. Targeted theoretical mass: $M_n$=30,000 g/mol. It is referred to as a polystyrene block for reasons of simplicity of the terminology.

The emulsion copolymer obtained previously in step 2 was used as starting material, after having removed ~5 g for analysis and without having stopped the heating.

0.390 g of ammonium persulfate $(NH_4)_2S_2O_8$ diluted in 50.0 g of water was introduced continuously over 3 hours. A mixture 3 was added simultaneously over 3 hours at 85° C., this mixture comprising:
50.0 g of water; and
0.95 g of sodium carbonate $Na_2CO_3$.

Simultaneously, a mixture 4 was added, this mixture comprising:
257.1 g of styrene (St); and
5.14 g of methacrylic acid (MAA).

After complete addition of the various ingredients, the copolymer emulsion obtained was kept at 85° C. for 1 hour.

Then 1.20 g of tert-butylbenzyl peroxide were introduced in a single go and the addition of a mixture 5 was started, this mixture comprising:
0.600 g of erythorbic acid; and
20.0 g of water.

The addition was continued for 60 minutes. After complete addition of the various ingredients, the emulsion was cooled to ~25° C. over one hour.

A sample (~5 g) was then removed and analyzed by size exclusion chromatography (SEC) in THF. Its measured number-average molecular weight $M_n$ was equal to 56,800 g/mol in polystyrene equivalents (calibration by linear polystyrene standards). Its polydispersity index $M_w/M_n$ was equal to 1.9.

An analysis of the sample by gas chromatography revealed that the monomer conversion was greater than 99.8%.

The product obtained was a dispersion in water of the copolymer (latex), with a solids content of around 44%.

EXAMPLE 1b

Preparation of a Polystyrene-Block-Poly(Ethyl Acrylate)-Block-Polystyrene Triblock Copolymer "$pS_{25}$-$pEA_{20k}$-$pS_{25k}$"

The procedure was based on a process which could be broken down into three distinct phases, a first step to obtain a polystyrene block, a second step to synthesize a poly(ethyl acrylate) block following on from the first block and a third step to synthesize a polystyrene block following on from the second block, in order to obtain the polystyrene-b-poly(ethyl acrylate)-b-polystyrene triblock.

The synthesis of this copolymer was carried out in a 2-liter SVL type glass reactor. The maximum working volume of this type of reactor was 1.5 liters. The temperature inside the reactor was regulated by a Huber cryostat. The temperature was measured by a pt 100 probe immersed in the reactor and serving for regulation. The stirring unit was a stainless steel paddle. The rotation speed of the spindle was around 200 rpm. The reactor was also fitted with a reflux device (coil condenser) sufficiently effective to allow reflux of the monomers without product loss.

The process used was a latex-type emulsion polymerization process in water.

Step 1: Preparation of a First Polystyrene Block Having a Theoretical Molecular Weight of about 25,000 g/mol "$pS_{25k}$"

In reality, this was a synthesis of a random styrene/methacrylic acid copolymer, with an St/MAA weight ratio=98/2. Targeted theoretical weight: $M_n$=25,000 g/mol. It is referred to as a polystyrene block for reasons of simplicity of the terminology.

518.2 g of water, 6.250 g of sodium dodecyl sulfate and 0.714 g of sodium carbonate $Na_2CO_3$ were introduced, at room temperature, as feed stock. The mixture obtained was stirred for 30 minutes (200 rpm) under nitrogen. The temperature was then raised to 75° C., and then a mixture 1 was added, this mixture comprising:
17.86 g of styrene (St);
0.357 g of methacrylic acid (MAA), and
1.486 g of xanthate $(CH_3)(CO_2CH_3)CH—S(C=S)OCH_2CH_3$.

The mixture was brought to 85° C., then a solution of 0.085 g of sodium persulfate $Na_2S_2O_8$ dissolved in 1.70 g of water was introduced.

After 5 minutes, the addition of a mixture 2 was started, this mixture comprising:
160.7 g of styrene (St) and
3.21 g of methacrylic acid (MAA).

Simultaneously, the addition of a mixture 3 comprising 0.255 g of sodium persulfate $Na_2S_2O_8$ dissolved in 5.10 g of water was started.

The addition was continued for 90 minutes. After complete addition of the various ingredients, the copolymer emulsion obtained was kept at 85° C. for two hours.

A sample (~5 g) was then removed and analyzed by size exclusion chromatography (SEC) in THF. Its measured number-average molecular weight Mn was equal to 22,000 g/mol in polystyrene equivalents (calibration by linear polystyrene standards). Its polydispersity index Mw/Mn was equal to 2.2.

An analysis of the sample by gas chromatography revealed that the monomer conversion was greater than 99%.

Step 2: Preparation of a Second Block of Poly(Ethyl Acrylate) Having a Theoretical Molecular Weight of Around 10,000 g/mol to Obtain a Polystyrene-Block-Poly(Ethyl Acrylate) Diblock Copolymer "$pS_{25k}$-$pEA_{20k}$"

The emulsion copolymer obtained previously in step 1 was used as starting material after having removed ~5 g for analysis and without having stopped the heating.

0.170 g of sodium persulfate $Na_2S_2O_8$ diluted in 3.4 g of water were introduced continuously over 90 minutes.

The following were added simultaneously over 90 minutes at 85° C.:

142.9 g of ethyl acrylate (EA).

The system was held at this temperature for a further two hours.

A sample (~5 g) was then removed and analyzed by size exclusion chromatography (SEC) in THF. Its measured number-average molecular weight $M_n$ was equal to 32,000 g/mol in polystyrene equivalents (calibration by linear polystyrene standards). Its polydispersity index Mw/Mn was equal to 2.6.

An analysis of the sample by gas chromatography revealed that the monomer conversion was greater than 99%.

Step 3: Preparation of a Third Block of Polystyrene Having a Theoretical Molecular Weight of Around 25,000 g/mol to Obtain a Polystyrene-Block-Poly(Ethyl Acrylate)-Block-Polystyrene Triblock Copolymer "$pS_{25k}$-$pEA_{20k}$-$pS_{25k}$"

In reality, this was a synthesis of a random styrene/methacrylic acid copolymer. St/MAA weight ratio=98/2. Targeted theoretical mass: $M_n$=25,000 g/mol. It is referred to as a polystyrene block for reasons of simplicity of the terminology.

The emulsion copolymer obtained previously in step 2 was used as starting material, after having removed ~5 g for analysis and without having stopped the heating.

0.340 g of sodium persulfate $Na_2S_2O_8$ diluted in 6.8 g of water was introduced continuously over two hours. A mixture 4 was added simultaneously over two hours at 85° C., this mixture comprising:

97.90 g of water; and
1.146 g of sodium carbonate $Na_2CO_3$; and
3.75 g of sodium dodecyl sulfate.

Simultaneously, a mixture 5 was added, this mixture comprising:

178.6 g of styrene (St); and
3.57 g of methacrylic acid (MAA).

After complete addition of the various ingredients, the copolymer emulsion obtained was kept at 85° C. for two hours.

Then 0.500 g of tert-butylbenzyl peroxide were introduced in a single go and the addition of a mixture 6 was started, this mixture comprising:

0.250 g of erythorbic acid; and
5.0 g of water.

The addition was continued for 60 minutes. After complete addition of the various ingredients, the emulsion was cooled to ~25° C. over one hour.

A sample (~5 g) was then removed and analyzed by size exclusion chromatography (SEC) in THF. Its measured number-average molecular weight $M_n$ was equal to 40,000 g/mol in polystyrene equivalents (calibration by linear polystyrene standards). Its polydispersity index $M_w/M_n$ was equal to 2.9.

An analysis of the sample by gas chromatography revealed that the monomer conversion was greater than 99.8%.

The product obtained was a dispersion in water of the copolymer (latex), with a solids content of around 45%.

EXAMPLE 1c

Preparation of a Polystyrene-Block-Poly(Ethyl Acrylate)-Block-Polystyrene Triblock Copolymer "$pS_{32.5k}$-$pEA_{5k}$-$pS_{32.5k}$"

The procedure was based on a process which could be broken down into three distinct phases, a first step to obtain a polystyrene block, a second step to synthesize a poly(ethyl acrylate) block following on from the first block and a third step to synthesize a polystyrene block following on from the second block, in order to obtain the polystyrene-b-poly(ethyl acrylate)-b-polystyrene triblock.

The synthesis of this copolymer was carried out in a 2-liter SVL type glass reactor. The maximum working volume of this type of reactor was 1.5 liters. The temperature inside the reactor was regulated by a Huber cryostat. The temperature was measured by a pt 100 probe immersed in the reactor and serving for regulation. The stirring unit was a stainless steel paddle. The rotation speed of the spindle was around 200 rpm. The reactor was also fitted with a reflux device (coil condenser) sufficiently effective to allow reflux of the monomers without product loss.

The process used was a latex-type emulsion polymerization process in water.

Step 1: Preparation of a First Polystyrene Block Having a Theoretical Molecular Weight of about 32,500 g/mol "$pS_{32.5k}$"

In reality, this was a synthesis of a random styrene/methacrylic acid copolymer, with an St/MAA weight ratio=98/2. Targeted theoretical weight: $M_n$=32,500 g/mol. It is referred to as a polystyrene block for reasons of simplicity of the terminology.

515.0 g of water, 6.250 g of sodium dodecyl sulfate and 0.929 g of sodium carbonate $Na_2CO_3$ were introduced, at room temperature, as feed stock. The mixture obtained was stirred for 30 minutes (200 rpm) under nitrogen. The temperature was then raised to 75° C., and then a mixture 1 was added, this mixture comprising:

23.21 g of styrene (St);
0.464 g of methacrylic acid (MAA), and
1.486 g of xanthate $(CH_3)(CO_2CH_3)CH$—$S(C$=$S)$$OCH_2CH_3$.

The mixture was brought to 85° C., then a solution of 0.085 g of sodium persulfate $Na_2S_2O_8$ dissolved in 1.70 g of water was introduced.

After 5 minutes, the addition of a mixture 2 was started, this mixture comprising:

208.9 g of styrene (St) and
4.18 g of methacrylic acid (MAA).

Simultaneously, the addition of a mixture 3 comprising 0.255 g of sodium persulfate $Na_2S_2O_8$ dissolved in 5.10 g of water was started.

The addition was continued for 80 minutes. After complete addition of the various ingredients, the copolymer emulsion obtained was kept at 85° C. for two hours.

A sample (~5 g) was then removed and analyzed by size exclusion chromatography (SEC) in THF. Its measured number-average molecular weight Mn was equal to 29,000 g/mol in polystyrene equivalents (calibration by linear polystyrene standards). Its polydispersity index Mw/Mn was equal to 2.2.

An analysis of the sample by gas chromatography revealed that the monomer conversion was greater than 99%.

Step 2: Preparation of a Second Block of Poly(Ethyl Acrylate) Having a Theoretical Molecular Weight of Around 10,000 g/mol to Obtain a Polystyrene-Block-Poly(Ethyl Acrylate) Diblock Copolymer "$pS_{32.5k}$-$pEA_{5k}$"

The emulsion copolymer obtained previously in step 1 was used as starting material after having removed ~5 g for analysis and without having stopped the heating.

0.170 g of sodium persulfate $Na_2S_2O_8$ diluted in 3.4 g of water were introduced continuously over 90 minutes.

The following were added simultaneously over 90 minutes at 85° C.:

35.7 g of ethyl acrylate (EA).

The system was held at this temperature for a further two hours.

A sample (~5 g) was then removed and analyzed by size exclusion chromatography (SEC) in THF. Its measured number-average molecular weight $M_n$ was equal to 34,000 g/mol in polystyrene equivalents (calibration by linear polystyrene standards). Its polydispersity index Mw/Mn was equal to 2.3.

An analysis of the sample by gas chromatography revealed that the monomer conversion was greater than 99%.

Step 3: Preparation of a Third Block of Polystyrene Having a Theoretical Molecular Weight of Around 32,500 g/mol to Obtain a Polystyrene-Block-Poly(Ethyl Acrylate)-Block-Polystyrene Triblock Copolymer "$pS_{35.5k}$-$pEA_{5k}$-$pS_{32.5k}$"

In reality, this was a synthesis of a random styrene/methacrylic acid copolymer. St/MAA weight ratio=98/2. Targeted theoretical mass: $M_n$=32,500 g/mol. It is referred to as a polystyrene block for reasons of simplicity of the terminology.

The emulsion copolymer obtained previously in step 2 was used as starting material, after having removed ~5 g for analysis and without having stopped the heating.

0.340 g of sodium persulfate $Na_2S_2O_8$ diluted in 6.8 g of water was introduced continuously over two hours. A mixture 4 was added simultaneously over two hours at 85° C., this mixture comprising:

104.4 g of water;
1.468 g of sodium carbonate $Na_2CO_3$; and
3.75 g of sodium dodecyl sulfate.

Simultaneously, a mixture 5 was added, this mixture comprising:

1232.1 g of styrene (St); and
4.64 g of methacrylic acid (MAA).

After complete addition of the various ingredients, the copolymer emulsion obtained was kept at 85° C. for two hours.

Then 0.500 g of tert-butylbenzyl peroxide were introduced in a single go and the addition of a mixture 6 was started, this mixture comprising:

0.250 g of erythorbic acid; and
5.0 g of water.

The addition was continued for 60 minutes. After complete addition of the various ingredients, the emulsion was cooled to ~25° C. over one hour.

A sample (~5 g) was then removed and analyzed by size exclusion chromatography (SEC) in THF. Its measured number-average molecular weight $M_n$ was equal to 50,000 g/mol in polystyrene equivalents (calibration by linear polystyrene standards). Its polydispersity index $M_w/M_n$ was equal to 2.6.

An analysis of the sample by gas chromatography revealed that the monomer conversion was greater than 99.8%.

The product obtained was a dispersion in water of the copolymer (latex), with a solids content of around 45%.

EXAMPLE 2

Composition

The following composition was produced, comprising the copolymer from Example 1 in the aqueous phase:

| Ingredients | Nature or INCI name | Amount by weight as is (%) | Amount by weight as is (%) | Amount by weight as is (%) | |
|---|---|---|---|---|---|
| Pecosil PS-100 | Dimethicone PEG-7 Phosphate | 2 | 2 | 2 | Oily phase |
| DC246 | Cyclohexasiloxane | 5 | 5 | 5 | |
| Parleam | Hydrogenated polyisobutene | 5 | 5 | 5 | |
| Water | | 69.15 | 69.15 | 69.15 | Aqueous phase |
| Carbopol 980 | Carbomer | 0.4 | 0.4 | 0.4 | |
| NaOH | | 0.3 | 0.3 | 0.3 | |
| Rhodicare S | Xantham Gum | 0.4 | 0.4 | 0.4 | |
| Pemulen TR2 | Acrylates/C10-30 Alkyl Acrylate Crosspolymer | 0.25 | 0.25 | 0.25 | |
| Phenotip | Preservative | 1 | 1 | 1 | |
| Copolymer from Example 1a | | | | 16.5 | |
| Copolymer from Example 1b | | | 16.5 | | |
| Copolymer from Example 1c | | 16.5 | | | |

EXAMPLE 3

Composition

The following composition was produced, comprising the copolymer from Example 1 in the aqueous phase:

| Ingredients | Nature or INCI name | Amount by weight as is (%) | Amount by weight as is (%) | Amount by weight as is (%) | |
|---|---|---|---|---|---|
| Cosmacol PSE | Dimiristyl Tartrate; Cetearyl Alcohol; C12-C15 PARETH-7; PPG-25-Laureth 25 | 1.5 | 1.5 | 1.5 | Oily phase |
| Arlacel 165FL | Glyceryl Stearate; PEG-100 Stearate | 2 | 2 | 2 | |
| Stearyl alcohol | Stearyl alcohol | 1 | 1 | 1 | |
| CD246 | Cyclohexasiloxane | 10 | 10 | 10 | |
| Nipabutyl | Preservative | 0.15 | 0.15 | 0.15 | |
| Water | | 67.85 | 67.85 | 67.85 | Aqueous phase |
| Methylparaben | Preservative | 0.25 | 0.25 | 0.25 | |
| Chlorphenesin | Preservative | 0.25 | 0.25 | 0.25 | |
| Disodium EDTA | | 0.05 | 0.05 | 0.05 | |
| AMPS | Ammonium Polyacryloyldimethyl Taurate | 0.4 | 0.4 | 0.4 | |
| Rhodicare S | Xanthan Gum | 0.2 | 0.2 | 0.2 | |
| Vantocyl CHG | Preservative | 0.25 | 0.25 | 0.25 | |
| Copolymer from Example 1A | | | | 16.5 | |
| Copolymer from Example 1b | | | 16.5 | | |
| Copolymer from Example 1c | | 16.5 | | | |

The invention claimed is:

1. A process for treating and/or modifying and/or coating non-keratinous surfaces comprising applying onto said surface a composition comprising a linear triblock copolymer having the structure A-B-A in which A is block comprising at least 90 wt % of units derived from styrene, and B is a block comprising at least 90 wt % of units derived from ethyl acrylate or from ethyl methacrylate, wherein the weight ratio between the units derived from styrene and the units derived from ethyl acrylate or from ethyl methacrylate is greater than or equal to 2.01,
   wherein the copolymer has an instantaneous recovery $R_i$<50% and a delayed recovery $R_{2h}$<70% after an elongation of 30%.

2. The process as defined by claim 1, wherein said weight ratio is greater than or equal to 2.5.

3. The process as defined by claim 1, wherein the composition comprising the triblock copolymer is in the form of a solution in a solvent, or in the form of a dispersion in an aqueous medium.

4. The process as defined by claim 1, said triblock copolymer having a number average molecular weight ranging from 20,000 to 1,000,000 g/mol.

5. The process as defined by claim 1, the block A having a number average molecular weight ranging from 1,000 to 200,000 g/mol.

6. The process as defined by claim 5, the block B having a number average molecular weight ranging from 1,000 to 100,000 g/mol.

7. A process as defined by claim 1, said composition further comprising a vector.

8. The process as defined by claim 7, wherein said surfaces are selected from the groups consisting of fabric surfaces, domestic surfaces, industrial surfaces, building surfaces and surfaces on civil engineering works.

9. The process as defined by claim 7, wherein said composition is formulated as:
   a detergent composition for hard surfaces;
   a washing powder;
   a fabric softener;
   a composition for making fabrics easier to iron; or
   a coating composition.

10. The process as defined by claim 1, wherein said composition comprising the linear triblock copolymer is in the form of a water-insoluble dispersion.

11. The process as defined by claim 7, said composition comprising the linear triblock copolymer being formulated as an emulsion.

12. The process as defined by claim 4, said triblock copolymer having an number average molecular weight ranging from 50,000 to 200,000 g/mol.

13. The process as defined by claim 5, said block A having a number average molecular weight ranging from 10,000 to 100,000 g/mol.

14. The process as defined by claim 6, said block B having a number average molecular weight ranging from 2,000 to 50,000 g/mol.

15. The process as defined by claim 9, wherein said coating composition is a paint, a hydraulic binder coating, a wall primer or a plaster.

* * * * *